United States Patent
Lebedev et al.

(10) Patent No.: US 10,854,341 B2
(45) Date of Patent: Dec. 1, 2020

(54) LOW POWER PRESSURE TUBE NUCLEAR REACTOR

(71) Applicant: RESEACH AND DEVELOPMENT CENTER FOR INNOVATIONS, Moscow (RU)

(72) Inventors: Larion Aleksandrovich Lebedev, Moscow (RU); Valeriy Alekseyevich Levchenko, Obninsk (RU)

(73) Assignee: Limited Liability Company "Research and Development Center for Innovations", Moscow (RU)

( * ) Notice: Subject to any disclaimer, the term of this patent is extended or adjusted under 35 U.S.C. 154(b) by 307 days.

(21) Appl. No.: 15/577,611

(22) PCT Filed: May 27, 2016

(86) PCT No.: PCT/RU2016/000320
§ 371 (c)(1),
(2) Date: Nov. 28, 2017

(87) PCT Pub. No.: WO2016/195541
PCT Pub. Date: Dec. 8, 2016

(65) Prior Publication Data
US 2018/0144834 A1 May 24, 2018

(30) Foreign Application Priority Data
May 29, 2015 (RU) .................................. 2015120422

(51) Int. Cl.
*G21C 1/20* (2006.01)
*G21C 15/04* (2006.01)
(Continued)

(52) U.S. Cl.
CPC ............... *G21C 1/20* (2013.01); *G21C 1/022* (2013.01); *G21C 11/06* (2013.01); *G21C 15/04* (2013.01);
(Continued)

(58) Field of Classification Search
CPC .......... G21C 1/20; G21C 1/022; G21C 11/06; G21C 15/04
(Continued)

(56) References Cited

U.S. PATENT DOCUMENTS

2015/0206604 A1* 7/2015 Pencer .................. G21C 15/06
376/434

FOREIGN PATENT DOCUMENTS

| RU | 2088981 | 8/1997 |
| RU | 56048 | 8/2006 |
| WO | WO2013/185230 | 12/2013 |

* cited by examiner

*Primary Examiner* — Jack W Keith
*Assistant Examiner* — Daniel Wasil
(74) *Attorney, Agent, or Firm* — Aleksandr Smushkovich

(57) ABSTRACT

A low-power nuclear reactor includes a housing and a reflector forming a reactor core. The core includes inner and outer primary tubes therein, arranged together as bayonet tubes and intended for circulating a coolant, and secondary tubes, accommodating elements of a control and protection system. The reactor further includes an intake chamber for coolant of a primary loop, and a discharge chamber for coolant of the primary loop, separated by a partition. The outer primary tubes are secured on the intake chamber's bottom, and the inner primary tubes are secured on the partition. Fuel assemblies are mounted in the inner primary tubes on suspensions, which are mounted on the discharge chamber's upper portion. The secondary tubes are sealed off from the intake and discharge chambers for the coolant of
(Continued)

the primary loop, and an inter-tube space of the core is filled with a medium or material transparent to neutrons.

10 Claims, 6 Drawing Sheets

(51) Int. Cl.
*G21C 1/02* (2006.01)
*G21C 11/06* (2006.01)
*G21C 7/04* (2006.01)
*G21C 9/033* (2006.01)

(52) U.S. Cl.
CPC .............. *G21C 7/04* (2013.01); *G21C 9/033* (2013.01); *Y02E 30/30* (2013.01)

(58) Field of Classification Search
USPC .................................. 376/347, 363
See application file for complete search history.

A

B

LOW POWER PRESSURE TUBE NUCLEAR REACTOR

CROSS-REFERENCE TO RELATED APPLICATIONS

This application is a U.S. national stage application of a PCT application PCTRU2016/000320 filed on 27 May 2016, whose disclosure is incorporated herein in its entirety by reference, which PCT application claims priority of a Russian Federation application RU2015120422 filed on 29 May 2015.

FIELD OF THE INVENTION

The invention is related to nuclear energy sector, particularly to low and ultra-low power reactors.

BACKGROUND OF THE INVENTION

In accordance with classification approved by IAEA (B. J. Csik Assessment of the world market for small and medium reactors. IAEA-TECDOC-999, Vienna, 1998), currently, low power nuclear reactors are reactors that do not exceed 300 MW. Medium power nuclear reactors are reactors in the range of 300-700 MW. Nuclear reactors exceeding 700 MW are high-powered reactors.

Initially, low-power reactors were utilized in military in submarines. Civil nuclear energy sector borrowed a lot from military designs during the period of its development. However, a stake was made in 600-1000 MW NPP. Such development in nuclear energy sector perhaps is reasonable for industrially developed countries, who have developed electrical networks, qualified personnel, technologies, and growing energy absorption to implement expensive projects.

However, the majority of developing countries do not have a sufficiently developed infrastructure, electrical transmission networks, sufficient population density and resources for large ambitious projects. To build a large power plant in those countries is not the best option in developing the energy sector at this stage. This will be even less effective if the nuclear energy would not be used to produce electricity, but, for example, for water desalination or heating. Therefore, it is more effective to utilize low power nuclear power plants with reactors, whose power does not exceed 25-40 MW.

Low power and ultra-low power NPPs have good benefits due to unstable prices for organic fuel and its tendency to increase in price. Nuclear energy usage ensures a better stability.

Besides significant advantages in fuel supply, environmental benefits for using ultra-low power NPPs was another motivation. Especially it is important to northern areas and island ecosystems, since they have weak capabilities for self-restoration.

Another advantage of nuclear energy is its multi-purpose use of low and ultra-low power nuclear energy by combining productions of electricity, hot water and steam, water desalination, etc. A relative simplicity of fuel supply combined with a long-term fuel campaign (7-15 years) and low power of a single reactor unit make such type of energy affordable and cost-effective.

In relation to abovementioned, reactors for such NPPs are actively developed in the world, while special attention is given to increasing the service life (up to 60 years) while performing overloads of the reactor's reactor core less frequently than once in 10 years.

There is a known reactor with fast neutrons for a low-power power plant with a large (long) interval of fuel replacement (Small, fast neutron spectrum nuclear power plant with a long refueling interval, U.S. Pat. No. 8,767,902, G21 C1/02, 2014). This reactor is used as a coolant of liquid sodium and designed to produce energy in the range of 50 to 100 MW, while the fuel replacement interval is 20 years.

Using liquid metal ensures a high power rating of the fuel, high conversion ratio, increased performance of thermodynamic cycle, and does not require high pressure, which improves the reactor's safety. A specific issue with fast reactors, first of all, with sodium coolants, is a large positive value of the sodium void reactivity effect, which negatively affects its safety in emergency situations by voiding the reactor core or boiling sodium.

There is also a known 300 kW heat supply reactor with 60 years of service life without permanent operating personnel (Y. A. Kazansky, V. A. Levchenko, E. S. Matusevich, Y. S. Yuriev, et al. Ultra-low power self-adjusting heat supplying reactor "MASTER IATE". "University news. Nuclear Energy". No 3, p. 63, 2003).

Disadvantages of this reactor are that it does not satisfy international requirements for non-proliferation of nuclear materials, since its operation requires approximately 40% enriched nuclear fuel, and low power of the reactor, consumed fuel, and reactor core materials yield a high-cost energy production. Furthermore, good technical and neutron-physical properties of the reactor became an insurmountable barrier for increasing power.

There is a known pressure-tube reactor with fast neutrons with liquid metal coolant (patent RU 2088981, G21 C 1/02, 1997). The advantages of pressure-tube reactors with fast neutrons over tank reactors are that pressure-tube design allows to adjust the individual coolant absorption in fuel channels, ensuring an optimal temperature mode for fuel rods.

The space between channels can be used to place control and protection systems (CPS). A significant positive moment is an independence of CPS from the first loop of reactor cooling—control rods cannot be expelled from the reactor core by the coolant flow, which ultimately increases the reliability of CPS and overall reactor safety.

A lack of the reactor housing filled with a coolant gives an important advantage to a pressure-tube reactor from the point of view of seismic stability especially when using lead-bismuth coolant. If there is a damage to the reactor housing, the consequences from voiding the reactor core or from sodium burning will be more serious than a from a damage to a single channel. The housing service life is restricted by its radiation and thermal stability. Replacing a housing in the reactor is almost impossible, while channel covers can be periodically replaced with new ones, as needed, and thus the service life of the reactor can be prolonged significantly.

Channel design relieves a problem of diverting remaining heat in case of stoppage of coolant circulation in the first loop, as well as significantly simplifies the problem solution of corium dispersion in case of reactor core meltdown to prevent a formation of a secondary critical mass.

BRIEF SUMMARY OF THE INVENTION

The proposed invention is a further development and improvement of low and ultra-low power pressure-tube reactor design, whose neutron spectrum is displaced into a space of intermediate and fast energies.

A technical result of the invention is to expand options of technical resources of nuclear reactors by designing a nuclear reactor with heat capacity around 30 MW with an increased service life and improved mass-dimensional parameters of the reactor in general.

Furthermore, the proposed reactor design ensures an improved heat exchange process due to an increase in evenness and effectiveness of heat removal by rated power of the reactor core of the nuclear reactor without increasing the coolant velocity.

The mentioned technical result is achieved by having a nuclear reactor, consisting of a housing with a reflector, forming an reactor core, first (fuel) process channels located within an reactor core, designed for coolant circulation along them, and second (controlling) process channels located within an reactor core, designed for placement of CPS components, the reactor also contains coolant supply chamber from the first loop and discharge chamber of the coolant of the first loop, divided by a partition.

First process channels are designed as Field tubes, whose external tubes are attached at the bottom of the coolant supply chamber of the first loop, while internal tubes are attached to the partition. Fuel rod arrays are installed within internal tubes and Field tubes on suspenders, attached to the upper part (lid) of the coolant discharge chamber of the first loop. Second process channels are isolated from coolant supply and discharge chambers of the first loop. The housing side of the reactor core is filled with medium or material, transparent for neutrons (or, in other words, having a small neutron absorption cross-section).

In the case of the invention design, the reflector may consist of a side reflector, designed, for example, as a pack of rings, and upper and lower reflectors.

In another case of invention design, zirconium alloy may be used as a housing side material, which has a small neutron absorption cross-section.

In yet another case of invention design, CPS controls may be placed on the upper part (lid) of the heat carrying discharge chamber of the first loop.

Also, emergency protection absorber rods, as well as compensating and control rods may be used as CPS components, placed within second process channels.

Aside from that, it is preferable for the invention design to use $B_4C$, enriched to 80% to $^{10}B$, as an absorber in shim rods.

It is also preferable to use $B_4C$, enriched to 20% to $^{10}B$ as an absorber for control rods.

In the case of invention design, a part of fuel rod arrays can be designed with $Gd_2O_3$ burnable absorber.

Also, a part of fuel rod arrays can be designed with Er burnable absorber.

The abovementioned is a summary of the invention and thus may contain simplifications, generalizations, inclusions and/or exclusions of details; therefore, technical specialists should take into consideration that this summary of the invention is only illustrative and does not mean any restrictions.

BRIEF DESCRIPTION OF DRAWINGS OF THE INVENTION

To better understand the idea of the proposed technical solution, a description of the exact example of invention is given below, which is not a limiting example of a practical implementation of a nuclear reactor in accordance with this invention with references to drawings, where the following is depicted.

DETAIL DESCRIPTION OF THE INVENTION

While the invention may be susceptible to embodiment in different forms, there are described in detail herein, specific embodiments of the present invention, with the understanding that the present disclosure is to be considered an exemplification of the principles of the invention, and is not intended to limit the invention to that as exemplified herein.

Figure 1:
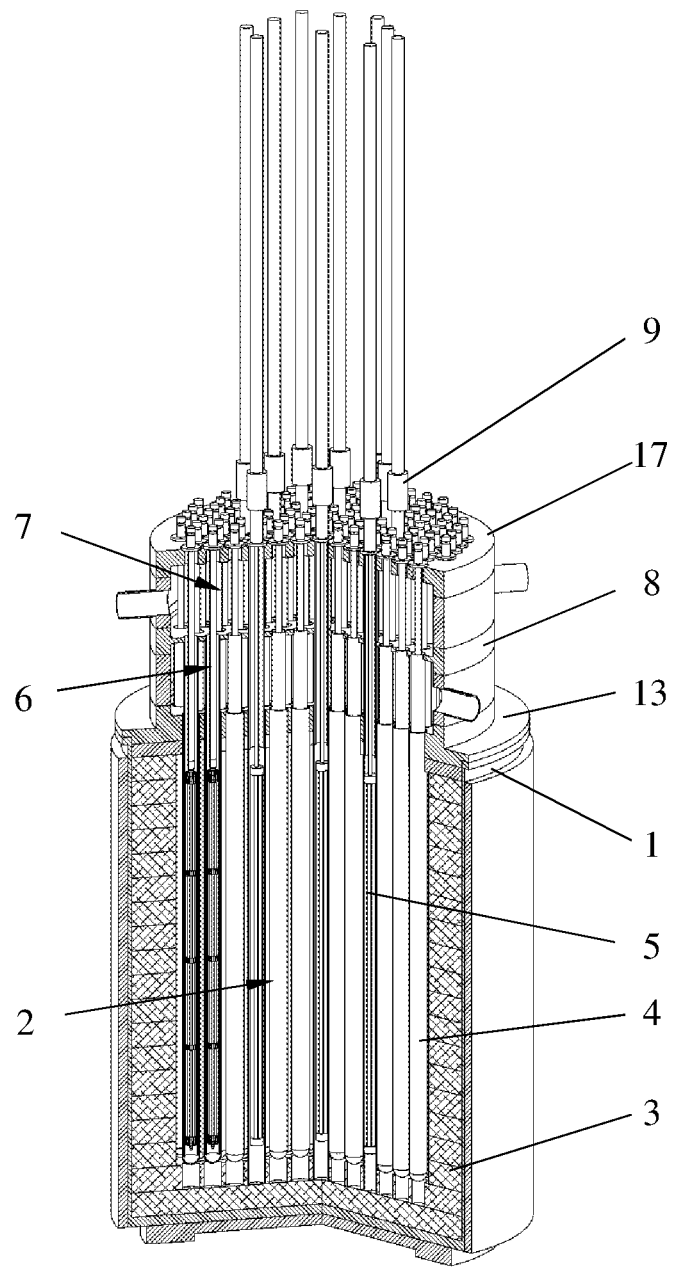
FIG. 1 shows an axonometric section of the general layout of the reactor in accordance with this invention.

The principal structural layout of the reactor is shown in FIG. 1. The reactor consists of a metal housing 1, within of which an reactor core 2 of the reactor is located, formed by reflector 3. First process channels 4, designed for the first loop coolant circulation, and second process channels 5, designed for the placement of CPS components are located within the reactor core.

First loop coolant supply chamber 6 and discharge chamber 7, separated by partition 8 are located above reactor core 2. CPS controls 9 are located above the first loop coolant discharge chamber 7.

Reflector 3 consists of a side reflector, designed as a pack of individual rings 10, lower reflector 11 and upper reflector 12. Al—Be alloy is used as a material for the reflector 3.

Figure 2:
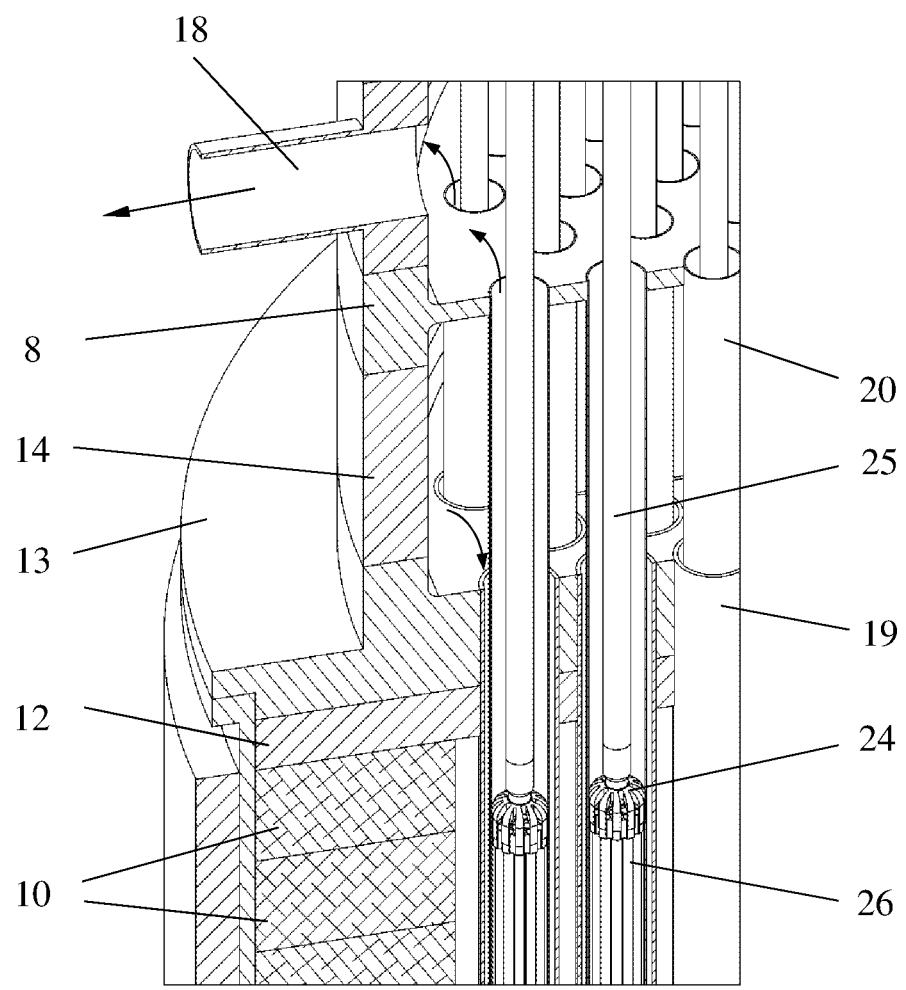
FIG. 2 shows a coolant supply and discharge chamber design of the first loop with locations of first process channels.

As shown in FIG. 2, first loop coolant supply chamber 6 consists of lid 13 of housing 1 of the reactor, side wall (housing) 14 and partition 8. Ducts 15 (FIG. 3) are located on side wall 14, which feed the first loop het carrier to supply chamber 6 by circulating pumps. Water $H_2O$ is used as a first loop coolant.

Figure 3:
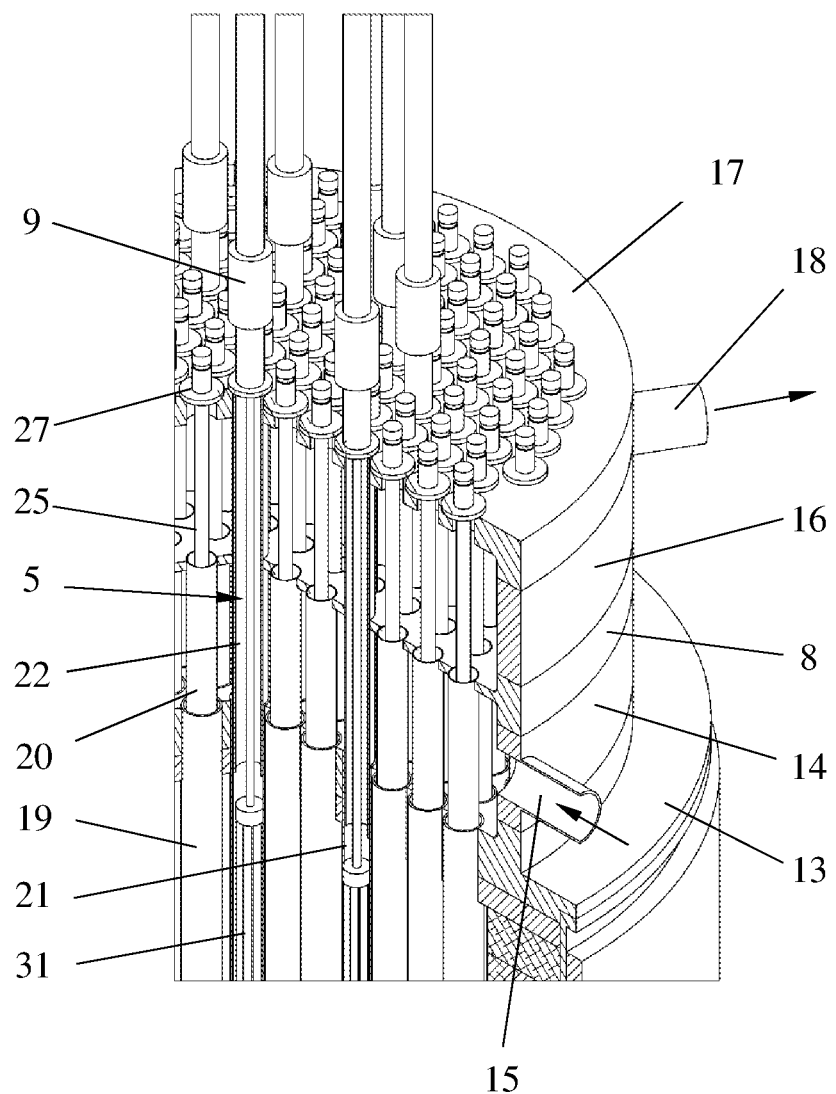
FIG. 3 shows a design of suspenders for fuel rod arrays and second process channels.

As shown on FIG. 3, the first loop coolant discharge chamber 7 is formed by partition 8, side wall 16 and upper lid 17. Ducts 18 are placed on side wall 16, which are used to carry the first loop coolant from chamber 7 to the heat exchanger, which can be designed as a steam generator.

First (fuel) process channels 4 (FIG. 2) are designed as Field tubes, each containing external tube 19 and internal tube 20. External tube 19 is welded into lid 13 of the reactor housing 1, designed as a tube plate with holes placed along the triangular grid. Internal tube 20 is welded into partition 8 between supply chamber 6 and discharge chamber 7 of the first loop coolant, which (partition) is designed also as a tube plate with holes corresponding to holes of lid 13.

Second (controlling) process channels 5 (FIG. 3) each containing tube 21, placed in the reactor core 2, and tube 22, passing through supply chamber 6 and discharge chamber 7 of the first loop coolant, and isolating second process channel from the coolant. The space 23 (FIG. 4) between process channels in the reactor core 2 is filled with zirconium alloy E-110, which has a small neutron absorption cross-section.

Figure 5:
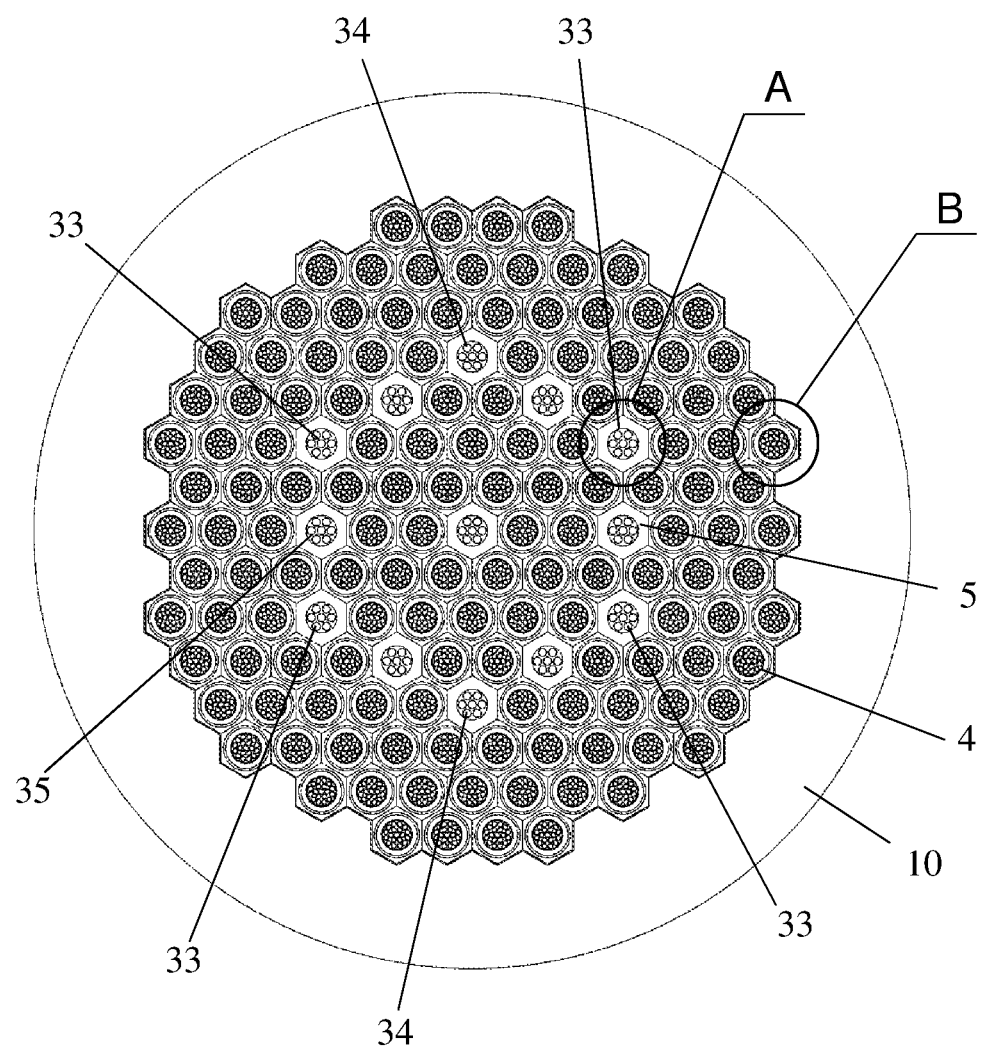
FIG. 5 shows a cross-section of the reactor's reactor core.

The locations of first and second process channels in the reactor core 2 are shown in FIG. 5.

Suspenders of fuel rod arrays 24 are installed on the upper lid 17 (FIG. 3) of the first loop coolant discharge chamber 7. Fuel rod array 24 consists of the central rod 25, at the lower end of which a bundle of 18 fuel rods 26 is attached. A special flange 27 is located at the upper end of the central rod 25 to tighten suspenders of fuel rod array 24 on the upper lid 17 and to grip fuel rods while installing and removing it from the reactor core 2.

Figure 4:
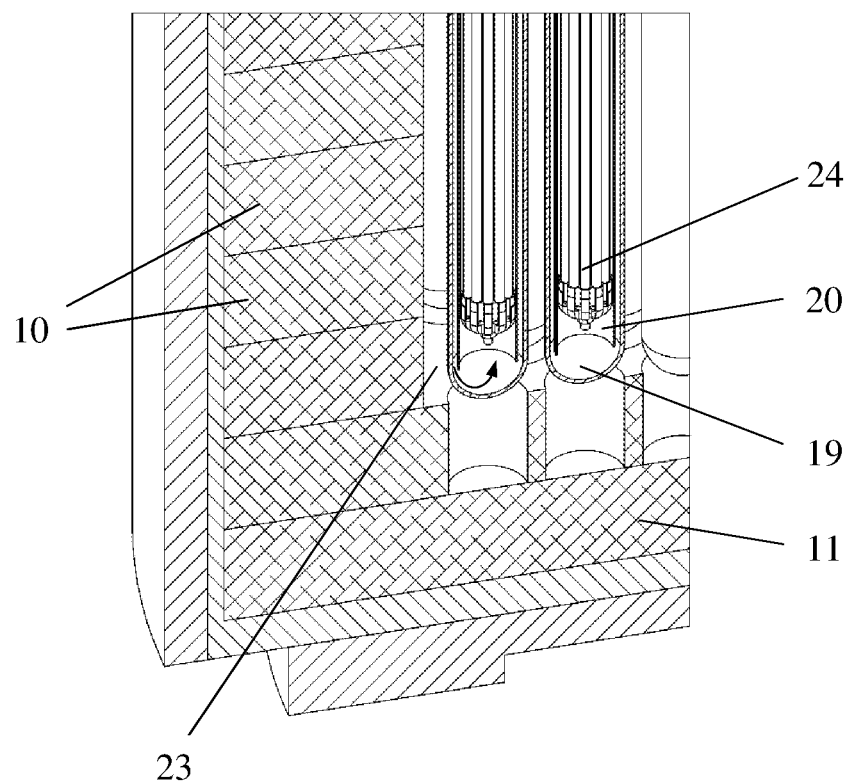
FIG. 4 shows a design of first process channels with fuel rod arrays.

The coolant from circulating pumps through ducts 15 feeds into supply chamber 6 of the coolant to first process channels. Then, as shown in FIG. 2, along the space between external tube 19 and internal tube 20 of Field tubes, fed pre-heated into the reactor core 2. Further, as shown in FIG. 4, the coolant travels to internal tube 20, where fuel rod array 24 is located. Traveling through the fuel rod array, the coolant is completely heated to the required temperature and returns to coolant discharge chamber 7, and then, through ducts 18, fed to the heat exchanger.

Such design of fuel channels allows to half linear dimensions of the reactor core, in our case, the height. Furthermore, an evenness and effectiveness of the heat removal due to a partial heat dissipation at the coolant outlet from internal tubes 20 to the coolant at the inlet to external tubes 19. Also, fuel rod heat load distribution along their lengths is improved.

The reactor design is simple, which ensures a total compensation of temperature deformations. All of this allows to ensure a large consumption of the coolant through a reactor core, which increases rated power and gives a heat power capability of 20 MW at small dimensions.

The described reactor's fuel rods are enriched uranium dioxide. Advantages include an optimal processing of this type of fuel, confirmed by its usage for thousands of reactor years. Uranium enrichment for nuclear fuel production is limited to 20% in accordance with IAEA requirements to prevent a proliferation of nuclear weapons. The chosen enrichment equals to 19% by uranium-235 content (enrichment, similar to production fuel for BN-800 reactors). A choice of the maximum allowed value of enrichment allows to reduce the size of the reactor core, reaching the required reactivity margin and high depth of burning.

To ensure long operational life of the reactor without overloads, a large reactivity margin (around 22%) is required. A compensation of such margin at minimum number of absorbing rods in the reactor core and ensuring an internal self-defense are achieved by using fuel with burnable absorber. Erbium (Er) and Gadolinium (GdC) are used as burnable absorbers.

Figure 7:
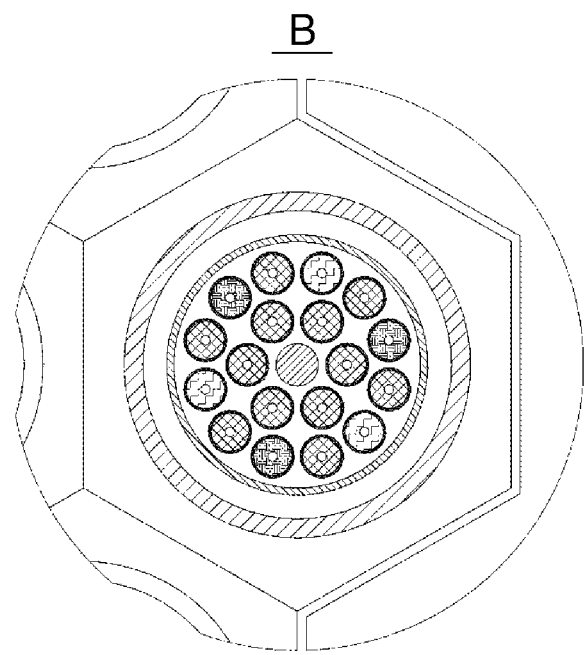
FIG. 7 shows view B of FIG. 5.

The positions and content of fuel rods of the fuel rod array 24 are shown in FIG. 7. A fuel rod array contains three Er fuel rods 28, three $Gd_2O3$ fuel rods, and twelve rods 30 that do not contain a burnable absorber.

Figure 6:
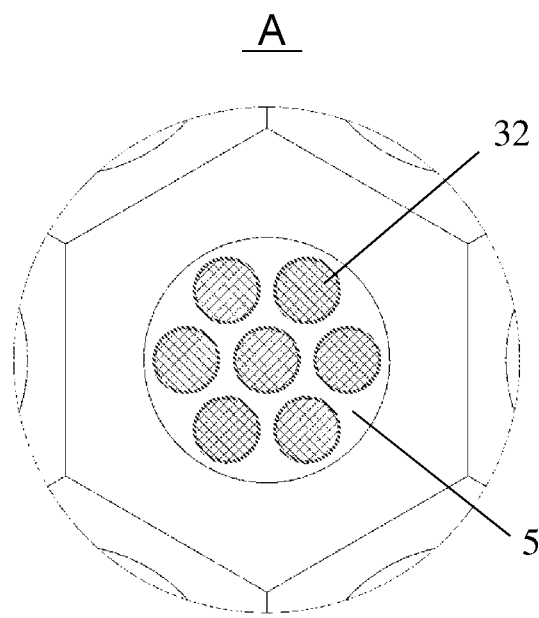
FIG. 6 shows view A of FIG. 5.

The reactor control is performed by thirteen regulating CPS controls (FIG. 2), each one of them is designed as a pack of seven absorbing rods 32 (FIG. 6). All packs of CPS absorbing rods are divided into the following groups, according to their purpose:

four packs 33 of compensating rods, ensuring a compensation of the reactivity margin of the reactor, created by the loss of reactivity as a result of fuel burning;

two packs 34 of control rods, ensuring control and support for the reactor power during its operation;

seven packs 35 of emergency protection rods, ensuring a quick decrease in power and switching the reactor to sub-critical mode when there are normal operation failures and emergency situations.

As shown in FIG. 5, twelve packs of absorbing rods are located along the hexagon perimeter and one pack (emergency protection) is located at the center of the reactor core. Packs 34 of control rods are symmetric to each other relative to the reactor core center.

$B_4C$, enriched to 80% to $^{10}B$, is used for compensating and emergency protection rods, and $B_4C$, enriched to 20% to $^{10}B$, is used for absorbing and control rods.

The proposed invention is not limited to the abovementioned options of its practical implementation. Thus, for example, we can assume that using internal designs, having the shape, quantity of components and locations differ from those described above.

The invention claimed is:

1. A nuclear reactor, comprising: a housing with a reflector, forming a reactor core including an inner space; first process channels, located in the reactor core, designed for coolant circulation; second process channels, located in the reactor core, designed for placement of control and protection system components; a plurality of fuel rod arrays; a first coolant loop; wherein:

the first coolant loop comprises a supply chamber including a bottom and a discharge chamber separated from the supply chamber by a partition; the first process channels are designed as bayonet tubes, each said bayonet tube includes an external tube and an internal tube, each said external tube is attached to the bottom of the supply chamber, and each said internal tube is attached to the partition; each fuel rod array of said plurality of fuel rod arrays is installed on a suspender, inside of each corresponding said internal tube, wherein the suspender is attached to an upper part of the discharge chamber; the second process channels are isolated from the supply chamber and the discharge chamber; and the inner space of the reactor core is filled with medium or material transparent for neutrons.

2. The nuclear reactor according to claim 1, wherein: the reflector comprising a side reflector designed as a pack of rings, an upper reflector and a lower reflector.

3. The nuclear reactor according to claim 1, wherein: the inner space is filled with a zirconium alloy.

4. The nuclear reactor according to claim 1, wherein: said control and protection system components include control and protection system controls located at an upper part of the discharge chamber.

5. The nuclear reactor according to claim 1, wherein: said control and protection system components include emergency protection absorbing rods, compensating rods, and absorbing control rods.

6. The nuclear reactor according to claim 5, wherein: the compensating rods and the emergency protection absorbing rods include an absorber consisting of $B_4C$ enriched to 80% for $^{10}B$.

7. The nuclear reactor according to claim 5, wherein: the control rods include an absorber consisting of $B_4C$ enriched to 20% for $^{10}B$.

8. The nuclear reactor according to claim 1, wherein: said plurality of fuel rod arrays include a part of fuel rods filled with $Gd_2O_3$ burnable absorber.

9. The nuclear reactor according to claim 1, wherein: said plurality of fuel rod arrays include a part of fuel rods filled with Er burnable absorber.

10. The nuclear reactor according to claim 1, wherein: said plurality of fuel rod arrays include a first number of fuel rods filled with $Gd_2O_3$ burnable absorber and a second number of fuel rods filled with Er burnable absorber.

* * * * *